United States Patent [19]

Mascia et al.

[11] Patent Number: 5,212,016
[45] Date of Patent: May 18, 1993

[54] PROCESS FOR PROTECTING AND CONSOLIDATING STONE MATERIALS

[75] Inventors: Liberato Mascia, Loughborough, Great Britain; Giovanni Moggi; Desiderata Ingoglia, both of Milan, Italy

[73] Assignee: Ausimont S.p.A., Milan, Italy

[21] Appl. No.: 767,129

[22] Filed: Sep. 27, 1991

[30] Foreign Application Priority Data

Oct. 1, 1990 [IT] Italy ................... 21613 A/90

[51] Int. Cl.$^5$ ........................... B32B 27/00
[52] U.S. Cl. ................... 428/422; 427/393.6; 427/421; 427/422; 427/429; 427/443.2; 428/421; 428/500; 428/540; 428/688
[58] Field of Search ............ 427/339.6, 429, 422, 427/421, 430.1, 443.2; 428/421, 422, 500, 688, 540

[56] References Cited

U.S. PATENT DOCUMENTS

| | | | |
|---|---|---|---|
| 4,400,487 | 8/1983 | Stoneberg et al. | 525/199 |
| 4,499,146 | 2/1985 | Piacenti et al. | 428/422 |
| 4,557,977 | 12/1985 | Memmer et al. | 428/421 |
| 4,739,024 | 4/1988 | Moggi et al. | 526/216 |
| 4,745,009 | 5/1988 | Piacenti et al. | 427/393.5 |
| 4,764,431 | 8/1988 | Piacenti et al. | 428/421 |
| 4,985,282 | 1/1991 | Moggi et al. | 427/393 |
| 4,990,406 | 2/1991 | Kappler et al. | 428/422 |
| 5,063,092 | 11/1991 | Lenti et al. | 427/393 |
| 5,081,175 | 1/1992 | Yagi et al. | 524/357 |

FOREIGN PATENT DOCUMENTS

| | | |
|---|---|---|
| 671310 | 10/1965 | Belgium . |
| 0192494 | 2/1986 | European Pat. Off. . |
| 0294755 | 12/1988 | European Pat. Off. . |
| 53-146752 | 5/1977 | Japan . |
| 59041257 | 5/1977 | Japan . |
| 7306599 | 11/1973 | Netherlands . |

OTHER PUBLICATIONS

Kirk-Othmer, "Encyclopedia of Chemical Technology", vol. 8, pp. 500–515 (1979 Ed.).

*Primary Examiner*—Bernard Pianalto
*Attorney, Agent, or Firm*—Bryan Cave

[57] ABSTRACT

Surfaces of stone materials, marble, sandstone, bricks, concrete and articles manufactured therefrom are consolidated and protected from atmospheric agents and pollutants by applying onto said surfaces a mixture consisting of:

(a) 2–40% by weight of polyvinylidene fluoride, or 1–20% by weight of a polyalkylmethacrylate wherein the alkyl group contains from 1 to 4 carbon atoms;

(b) an elastomeric copolymer of vinylidene fluoride, constituting the balance to 100% and being, in moles, 55–85% of vinylidene fluoride, 15–45% of hexafluoropropene and 0–30% of tetrafluoroethylene.

8 Claims, No Drawings

PROCESS FOR PROTECTING AND CONSOLIDATING STONE MATERIALS

FIELD OF THE INVENTION

The present invention relates to a process for consolidating and protecting stone materials, marble, sandstone and concrete and manufactured articles therefrom which are exposed to the degrading action caused by atmospheric agents and pollutants.

BACKGROUND OF THE INVENTION

As known, the decay of building materials (marble, sandstone, bricks, etc.) and of decorative and artistic articles manufactured from these materials is determined by various phenomena both physical and chemical in nature which mainly occur in the presence of water. In order to effectively exert its function, a consolidating/protective agent must then primarily markedly reduce the extent and rate of penetration of water into the interior of the material to be protected. On the other hand one must prevent that the protective layer, while exerting said action, simultaneous induce collateral decay phenomena or however undesirable secondary effects. The essential characteristics of a good consolidating/protective agent can therefore by summarized as follows:

1. Ability to restore the cohesion between the particles of the surface layer of the decayed material and the underlying integral part.
2. Exhibiting an adequate mechanical strength of the so consolidated surface layer.
3. Retaining characteristics of elasticity within the consolidated surface layer in order to prevent the formation of a stiff surface layer having mechanical characteristics different from the substrate.
4. Chemical inertia toward the material to be protected and consolidated.
5. Low volatility.
6. Stability toward the action of atmospheric agents, of light and of heat.
7. Not altering the chromaticity of the material.
8. Preserving for a long time its solubility characteristics in order to assure the reversibility of the treatment.
9. Maintaining a sufficient permeability of the treated surface to air and water vapor, in order to prevent alteration phenomena underneath the impermeable film, due to condensed water within the interior of the same materials.

It is known the use of perfluoropolyethers as protective agents for manufactured articles in stone and concrete, as described for example in U.S. Pat. Nos. 4,499,146 and 4,745,009. Said products, while solving the problem of protection, do not however exert a consolidating function due to their liquid nature. A consolidating action has been achieved by using polymers based on vinylidene fluoride, which effectively exert both a protective function and mainly a consolidating action. As described in U.S. Pat. No. 4,764,431, this result is obtained by applying on the material to be protected and consolidated a solution in volatile solvents of a polymer based on vinylidene fluoride, preferably copolymerized with hexafluoropropene.

DETAILED DESCRIPTION OF THE INVENTION

The Applicant has now surprisingly found that the application of a composition, formed of (b) a fluoroelastomer based on vinylidene fluoride and (a) a non-elastomeric (co)polymer based on polyvinylidene fluoride or a polyalkylmethacrylate, provides for superior performance in terms of both protection and consolidation compared to the performance achievable by using the fluoroelastomer alone.

It is therefore an object of the present invention to provide a process for consolidating and protecting stone materials, marble, sandstone and concrete and manufactured articles therefrom, from the degrading action caused by atmospheric agents and pollutants, which comprises the use as protective and consolidating agent of a composition formed of:

(a) 2-40% by weight of a non-elastomeric (co)polymer based on vinylidene fluoride (PVDF), or 1-20% by weight of a polyalkylmethacrylate wherein the alkyl group contains from 1 to 4 carbon atoms; and (b) an elastomeric copolymer of vinylidene fluoride (VDF), constituting the balance to 100% by weight and formed of, in moles, 55-85% of VDF, 15-45% of hexafluoropropene (HFP) and 0-30% of tetrafluoroethylene (TFE).

The composition is prepared by mixing components (a) and (b), in the form of a solution in organic solvents or of an aqueous emulsion, and it is applied onto the material to be protected by any of the known techniques, such as, for example, by brushing, using a compressed air gun, by spraying or by immersion. The brushing method is generally preferred when emulsions are used. The non-elastomeric copolymers (a), based on VDF, are preferably those in which VDF is $\geq 65\%$ by moles, TFE $\leq 35\%$ by moles, HFP $\leq 5\%$ by moles and/or CTFE $\leq 5\%$ by moles. In general the component (a) based on VDF has a melting point $\geq 100°$ C.

The PVDF which can be used as component (a) can be for example a high molecular weight commercial product, such as KYNAR 301 ® by Pennwalt ($\overline{M}_n \geq 10^5$) which is soluble in solvents such as cyclohexanone, pinacolone, methylethylketone (MEK) dimethylsulfoxide, dimethylformamide or dimethylacetamide. The use of component (a) based on VDF in amounts not greater than 15% by weight based on the dry ingredients is preferred in particular applications requiring a more rapid solvent evaporation. Another suitable PVDF is a homopolymer of VDF having low molecular weight ($\overline{M}_n = 2,000-6,000$), prepared according to U.S. Pat. No. 4,739,024 and soluble in low boiling solvents, such as methyl acetate, ethyl acetate, acetone, methylethylketone, which allows a more rapid drying of the treated surface. Other copolymers (a) which can be used are the commercial products KYNAR SL ® and KYNAR FLEX 2800 ®, soluble for instance in MEK. The polyalkylmethacrylates of component (a), wherein the alkyl group contains from 1 to 4 carbon atoms, are products commonly available on the market under various commercial names, among which one may mention, for example, DIAKON ®, by I.C.I.. Said polyalkylmethacrylates are soluble for example in particular in chlorinated solvents (e.g. chloroform, trichloroethylene), ketones (acetone), aromatic hydrocarbons (toluene), esters (ethyl acetate), cyclic ethers (tetrahydrofurane).

Polyalkylmethacrylate concentrations not greater than 10% by weight are generally preferred, in order to prevent the known drawbacks associated to the use of this type of resins when employed alone (yellowing during aging, low permeability to air and water vapor, poor effectiveness of protection against $SO_2$).

Preferred polyalkylmethacrylate concentrations are therefore comprised between 2 and 10% by weight. Elastomeric copolymers of VDF are widely known in the art, see, for instance, Kirk. Othmer, "Encyclopaedia of Chemical Technology", vol. 8, pp. 500 et seq. (1979 Edn.). These are unvulcanized fluoroelastomers, available on the market under various commercial names (TECNOFLON®, VITON®, FLUOREL®, DAIEL®). Among these fluoroelastomers, high molecular weight copolymers, that is having $\overline{M}_n \geqq 10^5$, are preferred, such as TECNOFLON NH® and TECNOFLON TN®.

Commonly employed solvents for fluoroelastomers based on VDF are selected from esters ($C_1$-$C_4$ alkyl formiates and acetates), ketones (acetone, methylethylketone), ethers (tetrahydrofurane, methylterbutylether).

The preparation of aqueous emulsions of fluoroelastomers based on VDF, homopolymers of VDF or its non-elastomeric copolymers is reported for instance in Polymer, 27, 905 (1986), where the product obtained by emulsion polymerization is directly employed, optionally stabilized with a stabilizer such as TRITON X100® and diluted with deionized water. At the moment of application, the total concentration based on the dry ingredients of the polymeric mixture in the organic solvent solution or in the aqueous emulsion is generally comprised between 1 and 20 grams per 100 ml of solvent or water, preferably between 2 and 5.

When solutions are employed, it is convenient to adopt proper measures to prevent a possible precipitation of the PVDF. To this purpose, it is generally advisable to prepare the solutions shortly before use.

The amount of protective and consolidating agent to apply per unit surface of the material to be consolidated/protected is a function of the physical characteristics of the surface, such as for instance porosity and disaggregation state of the material; the greater the porosity and the disaggregation state, the greater the amount of protecting/consolidating agent shall be used. Said amount is generally comprised between 5 and 100 g/m², preferably between 10 and 50 g/m².

The following examples are given for illustrative purposes and are not to be construed to limit by any mean the object and the scope of the present invention.

EXAMPLES 1–5 (Table I)

A sample of concrete (CL57/10) with a water/ordinary Portland cement/sand (0.5 mm)/aggregates (5–20 mm) ratio of 0.7/1/2.8/4 was prepared. Cubic samples (5×5×5 cm) were sectioned from the material, then aged for 3 months, oven aged at 100° C. for 2 days and then weighed.

The following solutions were prepared:
Solution 1:

2.4 g of KYNAR 301®; (PVDF with $\overline{M}_n = 10^5$ approximately) in 100 ml of cyclohexanone;
Solution 2:

7.2 g of TECNOFLON NH® (fluoroelastomer by Montefluos, formed of 79% VDF and 21% HFP, in moles, having $\overline{M}_n = 2 \times 10^5$ approximately) in 100 ml methylethylketone;
Solution 3:

the solution was prepared, immediately before use, by mixing Solution 1 with Solution 2 so that the TECNOFLON NH / PVDF weight ratio, based on the dry ingredients, was 90/10;
Solution 4:

the solution was prepared as Solution 3, but using a TECNOFLON/PVDF weight ratio of 80/20.

Each solution was applied by brushing onto a sample of the above concrete, in the amounts reported in Table I. After evaporating the solvent, tests for resistance to water penetration were performed, by keeping the sample immersed in water for 48 hours; the increase in weight was measured by weighing each sample prior to and after immersion. The same tests were performed on untreated specimens.

The protective effectiveness (E.P.) of each solution could be therefrom calculated, according to the formula:

$$E.P. \% = \frac{A - B}{A} \times 100$$

where A is the % weight increase of the untreated specimen, B that of the treated specimen.

Each value of % weight increase reported in Table I is the average of the results obtained from two equal specimens.

It can be observed from the data reported in Table I that the E.P. % is markedly improved by employing mixtures of TECNOFLON NH and PVDF compared to using TECNOFLON NH alone or PVDF alone.

TABLE I

| EXAMPLE | TREATED MATERIAL | PROTECTIVE and CONSOLIDATING AGENTS | TOTAL QUANTITY of APPLIED PRODUCT (g/m²) | QUANTITY of PVDF APPLIED (g/cm²) | QUANTITY of TECNOFLON NH APPLIED (g/cm²) | WEIGHT INCREASE (%) | E.P. (%) |
|---|---|---|---|---|---|---|---|
| 1 | CLS 7/10 | — | — | — | — | 5.02 | — |
| 2 | " | Soln 1 | 10 | 10 | — | 3.65 | 27.3 |
| 3 | " | Soln 2 | 10 | — | 10 | 2.50 | 50.2 |
| 4 | " | Soln 3 | 10 | 1 | 9 | 2.15 | 57.2 |
| 5 | " | Soln 4 | 10 | 2 | 8 | 1.75 | 65.1 |

EXAMPLES 6–11 (Table II)

The following solutions were prepared:
Solution 5:

2.5 g of PVDF ($\overline{M}_n = 3,000$), prepared in accordance with U.S. Pat. No. 4,739,024, in 100 ml of methyl acetate;
Solution 6:

2,5 g of KYNAR FLEX 2800 (non-elastomeric VDF based copolymer containing about 2% by moles of HFP) in 100 ml of MEK:
Solution 7:

4 g of TECNOFLON TN® (fluoroelastomer by Montefluos, consisting of 65% VDF, 20% HFP, 15% TFE, in moles, having $\overline{M}_n$ of $5 \times 10^4$ approximately), in 100 ml in acetone;
Solution 8:

the solution was prepared by mixing Solution 5 and Solution 7 so that the weight ratio PVDF/TECNOFLON TN was 15/85.

Solution 9:

it was prepared by mixing Solution 6 and 7 in a weight ratio KYNAR FLEX 2800/TECNOFLON TN of 15/85.

Said solutions were applied onto a single face of cubic specimens (5×5×5 cm) of Lecce Stone (limestone having porosity between 33 and 37%). The protective effectiveness was determined according to the method described in U.S. Pat. Nos. 4,499,146 and 4,764,431, which consists of measuring the quantity of absorbed water per unit surface of the material using a micropipette connected to a face of the specimen. The E.P. % was calculated in an exactly analogous manner to the immersion method:

$$E.P. \% = \frac{Z - Y}{Z} \times 100$$

where Z and Y indicate the quantity of absorbed water per cm² of the untreated and treated specimen respectively.

The thus obtained results, reported in Table II, demonstrate also in this case the greater effectiveness of the composition of the invention compared to the separate components as protective agent.

The E.A. % was so calculated:

$$E.A. \% = \frac{P - Q}{P} \times 100$$

where P and Q indicate the weight loss per unit surface of the untreated and treated specimen respectively.

The data reported in Table III clearly show that the composition of PVDF and TECNOFLON TN is a more effective consolidating agent than the separately used components.

TABLE III

| EXAMPLE | TREATED MATERIAL | PROTECTIVE and CONSOLIDATING AGENTS | TOTAL QUANTITY of APPLIED PRODUCT (g/m²) | QUANTITY of PVDF APPLIED (g/cm²) | QUANTITY of TECNOFLON TN APPLIED (g/cm²) | WEIGHT LOSS (g/cm²) | E.A. (%) |
|---|---|---|---|---|---|---|---|
| 12 | LECCE STONE | — | — | — | — | 96 | — |
| 13 | LECCE STONE | Soln 5 | 40 | 40 | — | 77 | 20 |
| 14 | LECCE STONE | Soln 6 | 40 | — | 40 | 65 | 32 |
| 15 | LECCE STONE | Soln 7 | 40 | 6 | 34 | 43 | 50 |

EXAMPLES 16–20 (Table IV)

The following aqueous emulsions were prepared in accordance with Polymer, 27, 905 (1986):

Emulsion 1 (EM1):

aqueous dispersion of 10 g per 100 ml of water of PVDF, directly obtained from the emulsion polymerization of VDF, stabilized with 0.8% by weight of TRITON XI100 ®;

Emulsion 2:

aqueous dispersion of 30 g per 100 ml of water of a terpolymer of equivalent composition to TECNOFLON TN ® (65% VDF, 15% TFE, 20% HFP, in moles, having $\overline{M}_n$ of $6 \times 10^4$ approximately), directly obtained from emulsion polymerization of the above mentioned monomers, and stabilized with 2% by weight of TRITON X100 ®;

TABLE II

| EXAMPLE | TREATED MATERIAL | PROTECTIVE and CONSOLIDATING AGENTS | TOTAL QUANTITY of APPLIED PRODUCT (g/m²) | QUANTITY of/or KYNAR APPLIED (g/cm²) | QUANTITY of TECNOFLON TN APPLIED (g/cm²) | ABSORBED WATER (g/cm²) | E.P. (%) |
|---|---|---|---|---|---|---|---|
| 6 | LECCE STONE | — | — | — | — | 0.96 | — |
| 7 | LECCE STONE | Soln 5 | 20 | 20 | — | 0.67 | 30 |
| 8 | LECCE STONE | Soln 7 | 20 | — | 20 | 0.47 | 51 |
| 9 | LECCE STONE | Soln 8 | 20 | 3 | 17 | 0.32 | 67 |
| 10 | LECCE STONE | Soln 6 | 20 | 20 | — | 0.68 | 29 |
| 11 | LECCE STONE | Soln 9 | 3 | 20 | 17 | 0.31 | 68 |

EXAMPLES 12–15 (Table III)

The consolidating effectiveness (E.A. %) was determined on the same specimens of Examples 6–9 and treated with the same solutions as for Examples 6–9 using the method described in U.S. Pat. No. 4,764,431, which consists of measuring the weight loss of the specimens after abrasive treatment.

Emulsion 3:

mixture of Emulsion and Emulsion 2, diluted to a VDF/terpolymer weight ratio of 10/90;

Emulsion 4:

mixture of Emulsion 1 and Emulsion 2, at a PVDF/terpolymer weight ratio of 20/80.

Each emulsion was applied by brushing on a cubic specimen (5×5×5 cm) of Vicenza Stone (biocalcarenite having porosity of about 30%). The quantity of absorbed water per unit surface was measured on the so obtained specimens using the pipette technique already employed in Examples 6-9.

The E.P. % was calculated from these data. The obtained results (averaged over 4 specimen) are reported in Table IV and show that the protective action exerted by the mixture is superior to that of the separate components.

14 4 g of TECNOFLON NM ® (fluoroelastomer by Montefluos, consisting of 79% VDF and 21% HFP, in moles, $\overline{M}_n = 5 \times 10^4$) in 250 ml of acetone;
Solution 12:
the solution was prepared by mixing Solution 10 and Solution 11 so that the PMMA/TECNOFLON NM weight ratio was 10/90;
Solution 13:
the solution was prepared as Solution 12, but using a

TABLE IV

| EXAMPLE | TREATED MATERIAL | PROTECTIVE and CONSOLI- DATING AGENTS | TOTAL QUANTITY of APPLIED PRODUCT (g/m$^2$) | QUANTITY of PVDF APPLIED (g/cm$^2$) | QUANTITY of TECNOFLON TN APPLIED (g/cm$^2$) | ABSORBED WATER (g/cm$^2$) | E.P. (%) |
| --- | --- | --- | --- | --- | --- | --- | --- |
| 16 | VICENZA STONE | — | — | — | — | 1.24 | — |
| 17 | VICENZA STONE | Emlsn 1 | 30 | 30 | — | 0.88 | 29 |
| 18 | VICENZA STONE | Emlsn 2 | 30 | — | 30 | 0.68 | 45 |
| 19 | VICENZA STONE | Emlsn 3 | 30 | 3 | 27 | 0.45 | 64 |
| 20 | VICENZA STONE | Emlsn 4 | 30 | 6 | 24 | 0.51 | 59 |

EXAMPLES 21-25 (Table V)

Tests for consolidating effectiveness, as in Examples 12-15, on the same Lecce Stone, a high porosity material, were performed using the same emulsions employed in Examples 16-20. The results, reported in Table V, show that the use of the composition gives better results than the individual components.

PMMA/TECNOFLON NM weight ratio of 5/95.

The solutions were applied onto specimens of the same Vicenza Stone used in Examples 16-20.

The protective effectiveness was determined using the above described pipette method. Permeability to water was also measured, as described in U.S. Pat. No. 4,764,431.

The obtained data, reported in Table VI, show the

TABLE V

| EXAMPLE | TREATED MATERIAL | PROTECTIVE and CONSOLI- DATING AGENTS | TOTAL QUANTITY of APPLIED PRODUCT (g/m$^2$) | QUANTITY of PVDF APPLIED (g/cm$^2$) | QUANTITY of TECNOFLON TN APPLIED (g/cm$^2$) | WEIGHT LOSS (g/cm$^2$) | E.A. (%) |
| --- | --- | --- | --- | --- | --- | --- | --- |
| 21 | LECCE STONE | — | — | — | — | 112 | — |
| 22 | LECCE STONE | Emlsn 1 | 50 | 50 | — | 80 | 29 |
| 23 | LECCE STONE | Emlsn 2 | 50 | — | 50 | 68 | 39 |
| 24 | LECCE STONE | Emlsn 3 | 50 | 5 | 45 | 40 | 64 |
| 25 | LECCE STONE | Emlsn 4 | 50 | 10 | 40 | 37 | 67 |

EXAMPLES 26-29 (Table VI)

The following solutions were prepared:
Solution 10:
3.2 g of DIAKON MG ® (commercial name for the I.C.I. polymethylmethacrylate (PMMA)) in 200 ml of chloroform;
Solution 11:

superior protective effectiveness of PMMA/fluoroelastomer compositions compared to the individual components and indicate the high permeability to water vapor of the mixtures despite the presence of PMMA. Data relative to PMMA alone have not been reported because of their poor significance: specimens treated with Solution 10 have in fact shown a permeability to water vapor of only 10%, an unacceptable value for a good protective agent.

TABLE VI

| EXAMPLES | TREATED MATERIAL | PROTECTIVE and CONSOLI- DATING AGENTS | TOTAL QUANTITY of APPLIED PRODUCT (g/m$^2$) | QUANTITY of PMMA APPLIED (g/cm$^2$) | QUANTITY of TECNOFLON NM APPLIED (g/cm$^2$) | ABSORBED WATER (g/cm$^2$) | E.P. (%) | PERMEA- BILITY TO WATER VAPOR (%) |
| --- | --- | --- | --- | --- | --- | --- | --- | --- |
| 26 | VICENZA STONE | — | — | — | — | 1.23 | — | 100 |
| 27 | VICENZA STONE | Soln 11 | 30 | — | 30 | 0.71 | 42 | 80 |

TABLE VI-continued

| EXAMPLES | TREATED MATERIAL | PROTECTIVE and CONSOLIDATING AGENTS | TOTAL QUANTITY of APPLIED PRODUCT (g/m$^2$) | QUANTITY of PMMA APPLIED (g/cm$^2$) | QUANTITY of TECNOFLON NM APPLIED (g/cm$^2$) | ABSORBED WATER (g/cm$^2$) | E.P. (%) | PERMEABILITY TO WATER VAPOR (%) |
| --- | --- | --- | --- | --- | --- | --- | --- | --- |
| 28 | VICENZA STONE | Soln 12 | 30 | 3 | 27 | 0.53 | 57 | 71 |
| 29 | VICENZA STONE | Soln 13 | 30 | 1.5 | 28.5 | 0.53 | 57 | 77 |

EXAMPLES 30-33 (Table VII)

The consolidating affectiveness (E.A.) of the same solutions employed in Examples 26-29 was determined on the same Lecce Stone of Examples 6-9. The data, reported in Table VII, confirm the greater consolidating ability of the mixtures of the invention.

TABLE VII

| EXAMPLES | TREATED MATERIAL | PROTECTIVE and CONSOLIDATING AGENTS | TOTAL QUANTITY of APPLIED PRODUCT (g/m$^2$) | QUANTITY of PMMA APPLIED (g/cm$^2$) | QUANTITY of TECNOFLON NM APPLIED (g/cm$^2$) | WEIGHT LOSS (g/cm$^2$) | E.A. (%) | PERMEABILITY TO WATER VAPOR (%) |
| --- | --- | --- | --- | --- | --- | --- | --- | --- |
| 30 | LECCE STONE | — | — | — | — | 102 | — | 100 |
| 31 | LECCE STONE | Soln 11 | 50 | — | 50 | 63 | 38 | 76 |
| 32 | LECCE STONE | Soln 12 | 50 | 5 | 45 | 52 | 48 | 73 |
| 33 | LECCE STONE | Soln 13 | 50 | 2.5 | 47.5 | 51 | 50 | 75 |

What is calimed is:

1. A process for consolidating and protecting stone materials, marble, bricks, concrete and manufactured articles therefrom, from the degrading action caused by atmospheric agents and pollutants, which process comprises applying a protecting and consolidating agent thereto, said protective and consolidating agent comprising:
   (a) 2-40% by weight of a non-elastomeric (co)-polymer based on vinylidene fluoride, or 1-20% by weight of a polyalkylmethacrylate, wherein the alkyl group contains form 1 to 4 carbon atoms; and
   (b) an elastomeric copolymer of vinylidene fluoride, constituting the balance to 100% by weight and formed of, in moles, 55-85% of vinylidene fluoride, 15-45% of hexafluoropropene and 0-30% of tetrafluorethylene.

2. A process according to claim 1, wherein the polyalkylmethacryalte concentration is comprised between 2 and 10% by weight.

3. A process according to claim 1 wherein component (a) is a copolymer of VDF with 2% by moles of HFP.

4. A process according to claim 1 wherein said composition is applied in the form of a solution in organic solvents.

5. A process according to claim 1 wherein said composition is applied in the form of an aqueous emulsion.

6. The process according to claim 5 wherein said aqueous emulsion is applied by brushing.

7. The process of claim 1 wherein the protective and consolidating agent is applied by a method selected from the group consisting of: brushing, spraying, immersion, and application by a compressed air gun.

8. Stone materials, marble, sandstone, bricks and concrete consolidated and protected for the degrading action caused by atmospheric agents and pollutants by using the process according to the preceding claim 1.

* * * * *